US005930205A

United States Patent [19]

Baba et al.

[11] Patent Number: 5,930,205

[45] Date of Patent: Jul. 27, 1999

[54] TIMEPIECE MOVEMENT

[75] Inventors: Koji Baba; Hiroyuki Hashizume, both of Tokyo, Japan

[73] Assignee: Seiko Clock Inc., Japan

[21] Appl. No.: 08/954,742

[22] Filed: Oct. 20, 1997

[30] Foreign Application Priority Data

Oct. 18, 1996 [JP] Japan .................................... 8-276432

[51] Int. Cl.[6] ............................ G04B 19/04; G04B 19/02

[52] U.S. Cl. .............................................. 368/80; 368/220

[58] Field of Search ................................. 368/46, 47, 76, 368/80, 220, 223

[56] References Cited

U.S. PATENT DOCUMENTS 4,645,357 2/1987 Allgaier et al. ......................... 368/187
5,231,612 7/1993 Allgaier et al. ........................... 368/47
5,566,140 10/1996 Kohata et al. .......................... 368/620

FOREIGN PATENT DOCUMENTS

180880A1 5/1986 Germany .

*Primary Examiner*—Vit Miska
*Attorney, Agent, or Firm*—Adams & Wilks

[57] ABSTRACT

A timepiece movement comprises a light-emitting device for emitting light and a light-receiving device for receiving the light emitted from the light-emitting device. An hour wheel has a plurality of apertures through which light from the light-emitting device may pass. A minute wheel has an aperture through which light from the light-emitting device may pass, the aperture being positioned to become aligned with respective ones of the apertures of the hour wheel during rotation of the minute and hour wheels. Minute and hour wheel gear trains respectively rotate the minute wheel and the hour wheel as a function of minute and hour time.

26 Claims, 5 Drawing Sheets

TIMEPIECE MOVEMENT

BACKGROUND OF THE INVENTION

1. Field of the Invention

The present invention relates to a timepiece movement and, more particularly, to a timepiece movement having independently rotatable minute and hour wheels and which can detect a respective reference position of the minute wheel and the hour wheel.

2. Background Information

An example of a conventional timepiece movement of the kind to which this invention relates is described in Japanese Published Patent Application No. Shou 61(1986)-118683. Such a conventional timepiece movement detects when an hour hand, minute hand and second hand are displaying the time 12 o'clock (i.e., 12 hours, zero minute and zero second), detects any difference (error) between the time of which this 12 o'clock time is displayed and the time at which a radio time signal or similar broadcast time signal for that hour is received, and, every 12 hours, corrects any error in the time displayed by the timepiece.

In one example disclosed in Japanese Published Patent Application No. Shou 61(1986)-118683, when respective openings in an intermediate wheel, an hour wheel and a minute wheel become aligned once per revolution of the hour wheel, i.e., once every 12 hours, light from a first luminous or light-emitting device mounted on a circuit board passes through the openings and is detected by a first light-receiving device mounted remote from the circuit board. The first light-receiving device then outputs a reference position signal denoting that the hour wheel and the minute wheel are in their reference positions. Similarly, once per revolution of the second hand, i.e., once per minute, when openings in an intermediate wheel and a second wheel become aligned, light from a second light-emitting device mounted on the circuit board passes through the openings and is detected by a second light-receiving device mounted remote from the circuit board, and the second light-receiving device then outputs a reference position signal denoting that the second wheel is in its reference position. When the two reference position signals are being outputted at the same time, it is judged that the time 12 o'clock is being displayed.

In a second example disclosed in Japanese Published Patent Application No. Shou 61(1986)-118683, in order to enable both the light-emitting devices and the light-receiving devices to be mounted on the circuit board, the first and second light-receiving devices are disposed in the same positions on the circuit board as the first and second light-emitting devices are disposed in the above first example, and a single light-emitting device is also mounted on the circuit board. Two light-conducting bodies are used to guide light from the light-emitting device to the positions where the first and second light-receiving devices are disposed in the above first example.

However, with the first example referred to above, there is the problem that because the two light-receiving devices which face the two light-emitting devices are disposed remote from the circuit board, wires have to be provided to electrically connect both of the light-receiving devices to circuitry on the circuit board. The installation of these wires is an awkward and time-consuming task, whereby the timepiece movement cannot be easily mass-produced. In addition, misalignment between the light-emitting devices can occur during assembly or during use, which makes it impossible for the reference positions to be precisely detected.

In the case of the second example referred to above, there is the problem that, in order to mount the single light-emitting device and the two light-receiving devices on the same circuit board, two light-conducting bodies have to be installed. The light-conducting bodies have to be disposed in a confined space, whereby the construction of the timepiece movement is made complicated and the cost of manufacture is increased.

Another conventional timepiece movement of the kind to which this invention relates is described in Japanese Published Patent Application No. Hei 6(1994)-148354 which discloses an apparatus in which a detecting means is provided in each of the driving systems which respectively drive an hour hand and a minute hand. The detecting means comprises; a light sensor having a luminous element, a light-receiving element, and an opening provided in a gear train of each of the driving systems. The detecting means can detect when the hour wheel and the minute wheel are in predetermined reference positions, such as the 12 o'clock position.

However, in the conventional timepiece movement disclosed in Japanese Published Patent Application No. HEI6 (1994)-148354, since the detecting means provided in each of the driving systems which respectively drive the hour hand and the minute hand comprises a light sensor (e.g., reflecting photosensor), separate wires have to be provided to electrically connect these detecting means to the circuitry of the timepiece. The installation of these wires is an awkward and time-consuming task which render the structure of the timepiece and assembly thereof complex. Furthermore, the high cost of reflecting photosensors increases the overall manufacturing cost of the timepiece movement.

SUMMARY OF THE INVENTION

In order to solve the foregoing problems associated with the conventional art, it is an object of the present invention to provide a timepiece movement which can detect a respective reference position of a minute wheel and an hour wheel with high accuracy.

Another object of the present invention is to provide a timepiece movement which has a simple construction and is easy to manufacture.

Still another object of the present invention is to provide a timepiece movement which is suited for mass production and which can be manufactured at low cost.

The foregoing and other objects of the present invention are achieved by a timepiece movement comprising a minute wheel, a first gear train, first drive means for rotationally driving the first gear train to rotate the minute wheel as a function of minute time, an hour wheel, a second gear train, second drive means operable independently of the first drive means for rotationally driving the second gear train to rotate the hour wheel as a function of hour time, and detecting means for detecting a respective reference position of the minute wheel and the hour wheel and outputing respective reference position signals.

In one embodiment of the present invention, the detecting means comprises a light-emitting device for emitting light, a light-receiving device for receiving light emitted from the light-emitting device, a plurality of apertures disposed in the hour wheel through which light from the light-emitting device passes, and an aperture disposed in the minute wheel through which light from the light-emitting device passes and positioned to become aligned with one of the apertures of the hour wheel.

Preferably, the first gear train comprises a transmitting wheel for transmitting the rotational drive of the first drive means to the minute wheel, and the detecting means further comprises an aperture provided in the transmitting wheel through which light from the light-emitting device passes and positioned to become aligned with the aperture of the minute wheel and one of the apertures of the hour wheel. The transmitting wheel is preferably set on the higher speed side of the gear train than the minute wheel. By this construction, the reference position of each of the minute wheel and the hour wheel can be detected with high accuracy.

Preferably, the apertures of the hour wheel are separated by a plurality of shading portions of the hour wheel for preventing light from the light-emitting device to pass therethrough and be received by the light-receiving device. A preselected one of the shading portions has a width different, e.g., greater, than a width of each of the other shading portions. Preferably, the plurality of shading portions comprise three shading portions disposed at equal angular intervals.

According to the present invention, the timepiece movement further comprises control means for controlling an operation of the first drive means and the second drive means to rotationally drive the minute wheel, the transmitting wheel and the hour wheel to invert an output of the light-receiving device between a level 0, corresponding to a condition where the opening of each of the minute wheel and the transmitting wheel and one of the openings of the hour wheel are not in alignment and prevent permit light emitted from the light-emitting device to pass therethrough to be received by the light-receiving device, and a level 1, corresponding to a condition where the opening of each of the minute wheel and the transmitting wheel and one of the openings of the hour wheel are in alignment to thereby permit light emitted from the light-emitting device to be passed therethrough and be received by the light-receiving device.

The control means includes means for determining the reference position of the minute wheel by driving the minute wheel and the hour wheel in a stepwise manner while the light-emitting device emits light, detecting a position of the minute wheel when the output of the light-receiving device is inverted from the level 0 to the level 1, and setting the detected position of the minute wheel as the reference position of the minute wheel. The control means further includes means for determining the reference position of the hour wheel by driving the hour wheel in a stepwise manner while the minute wheel is not driven to selectively bring one of the shading portions of the hour wheel into alignment with the opening of the minute wheel and the opening of the transmitting wheel to thereby invert the output of the light-receiving device between the level 1 and the level 0, detecting the position of the hour wheel when the output of the light-receiving device is inverted to the level 1 after the hour wheel is rotated following the preselected shading portion coming into alignment with the opening of the minute wheel and the opening of the transmitting wheel, and setting the detected position of the hour wheel as the reference position of the hour wheel.

Preferably, the control means further includes means for recognizing that the preselected shading portion of the hour wheel has been aligned with the opening of the minute wheel and the opening of the transmitting wheel on the basis of the difference in width between the preselected shading portion and the other shading portions of the hour wheel.

By the foregoing construction of the timepiece movement according to the present invention, since the hour wheel and the minute wheel are independently rotated and the respective reference positions of the hour wheel and the minute wheel are detected by detecting means using only one light-emitting device and one light-receiving device, the timepiece movement has a simple construction, can be manufactured easily at low cost, and is suited to mass-production. Furthermore, since detection of the reference positions is performed by the hour wheel, the minute wheel and the transmitting wheel which is set at a higher speed side of the first gear train than the minute wheel, the respective reference positions of the minute wheel and the hour wheel can be detected with high accuracy.

DETAILED DESCRIPTION OF THE PREFERRED EMBODIMENT

A preferred embodiment of the present invention will now be described with reference to the accompanying drawings.

Figure 1:
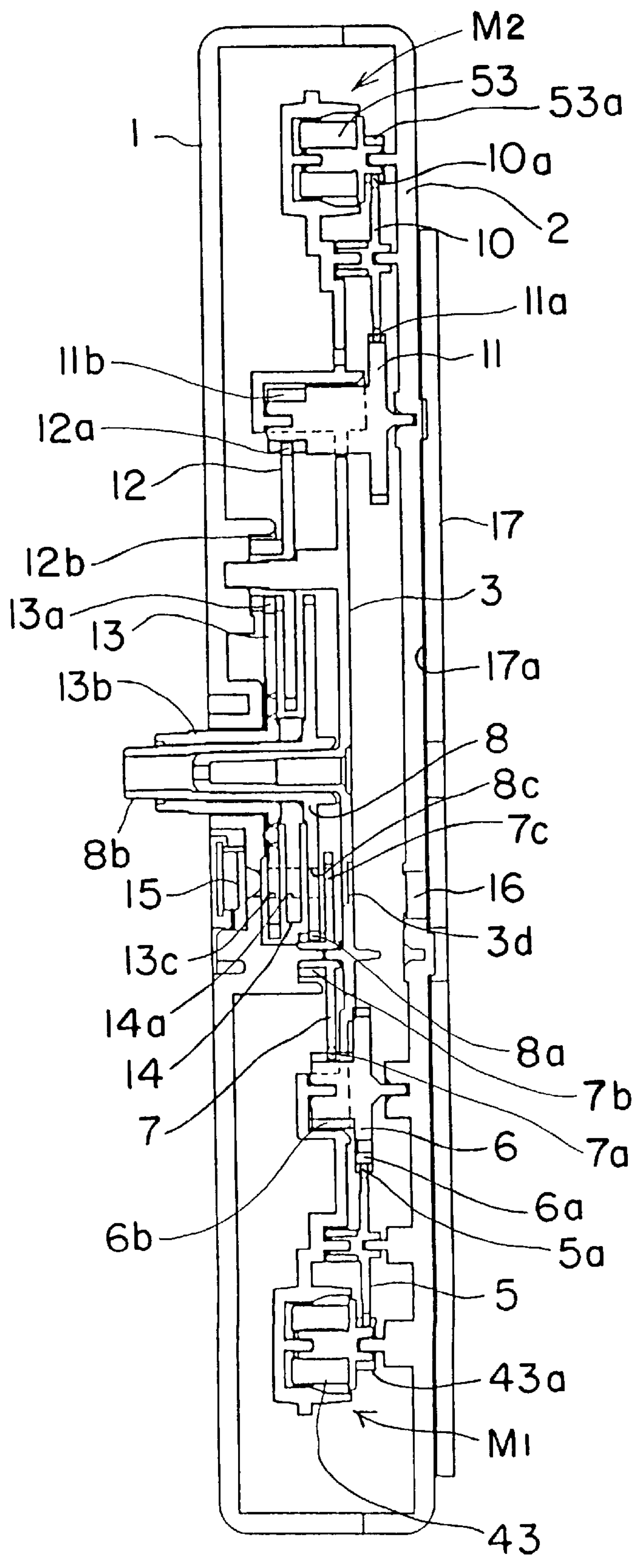
FIG. 1 is a cross-sectional view of a timepiece movement according to a preferred embodiment of the present invention.
Figure 2:
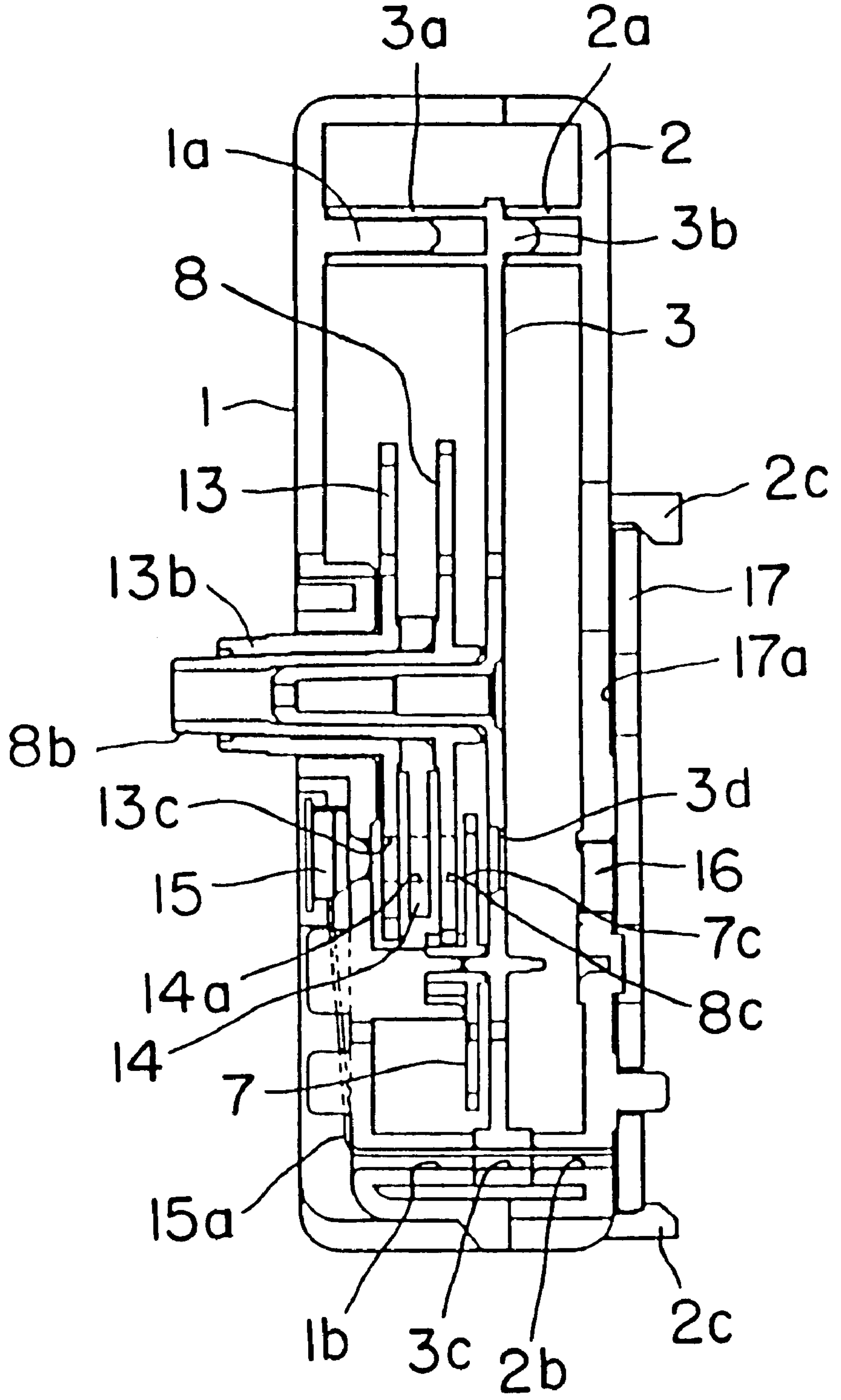
FIG. 2 is another cross-sectional view of the timepiece movement according to the preferred embodiment of the present invention.
Figure 3:
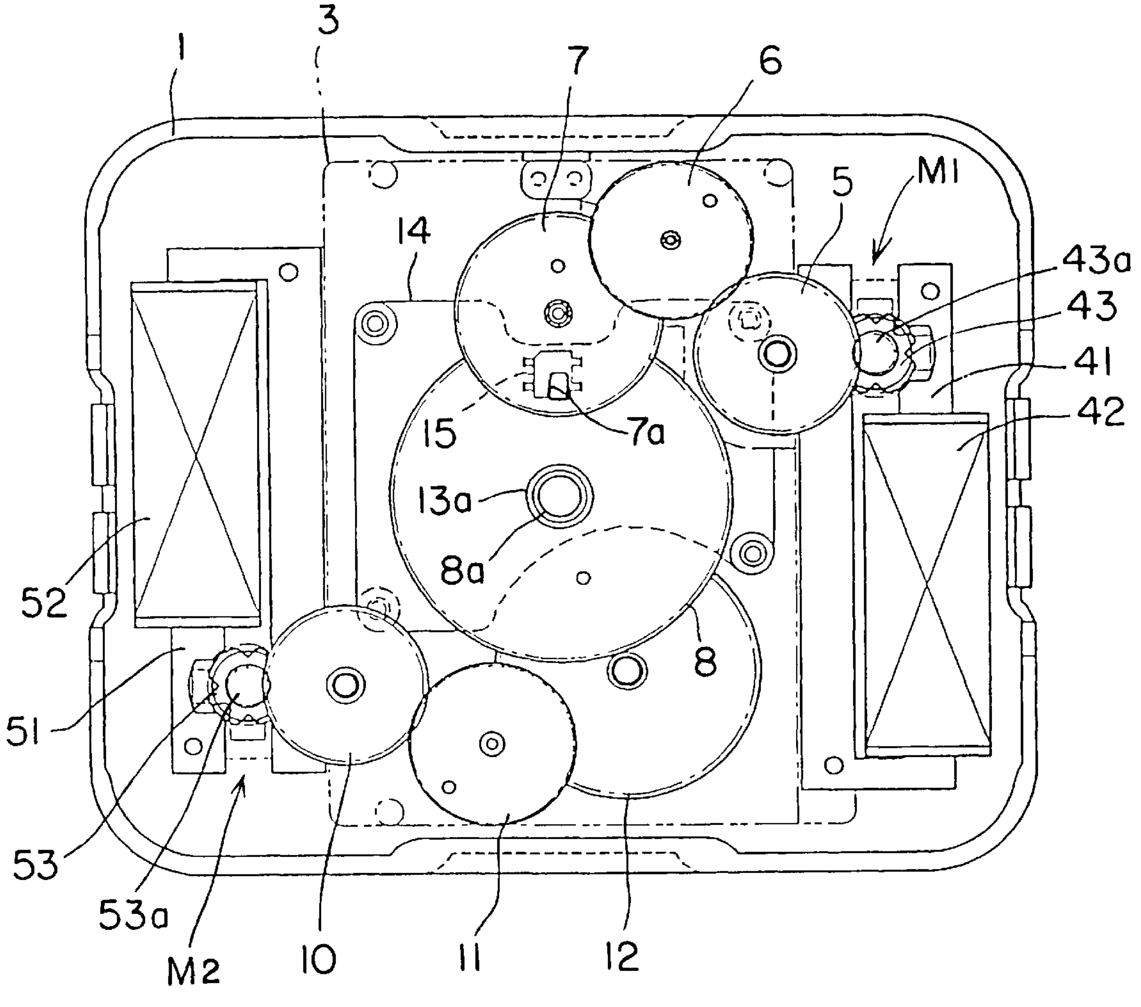
FIG. 3 is a plan view showing the timepiece movement of FIGS. 1 and 2 with the upper case removed.

As shown in FIGS. 1–3, the timepiece movement according to a preferred embodiment of the present invention has a case comprised of a lower case 1, an upper case 2 and a middle plate 3. The lower case 1 and the upper case 2 have a projection 1*a* and a tubular portion 2*a*, respectively, projecting into the case. The middle plate 3 has a tubular portion 3*a* and a projection 3*b* projecting in opposite directions. In the assembled state of the case, the projection 1*a* of the lower case 1 projects into the tubular portion 3*a* of the middle plate 3, and the projection 3*b* of the middle plate 3 projects into the tubular portion 2*a* of the upper case 2. The lower case 1, the upper case 2 and the middle plate 3 are also provided with tubular portions 1*b*, 2*b* and 3*c*, respectively, which are disposed in coaxial relationship with one another in the assembled state of the case to define a tubular passage extending from the lower case 1 to the upper case 2.

Two driving systems are mounted inside the case and include a pair of independently operable rotary motors M1 and M2 each capable of forward and reverse drive for respectively driving a minute wheel 8 and an hour wheel 13. A printed circuit board 17 is mounted in the case and supports the time movement circuitry. As further described below, detecting means for detecting a respective reference position of the minute wheel 8 and the hour wheel 13 is also disposed in the case.

The driving system for the minute wheel 8 will be described first. A first motor M1 comprises a stator 41 having an inverted C shape, a driving coil 42 wound around one leg of the stator 41, and a rotor 43 disposed between magnetic poles of the stator 41. The rotation of the motor M1 is transmitted by a first gear train, including a driving wheel 5, a transmitting wheel 6 and a transmitting wheel 7, to the minute wheel 8. The driving wheel 5 has a tooth portion 5*a* meshing with a pinion 43*a* of the rotor 43 and with a large diameter tooth portion 6*a* of the transmitting wheel 6. A large diameter tooth portion 7*a* of the transmitting wheel 7 meshes with a small diameter tooth portion 6*b,* coaxial with the large diameter tooth portion 6*a,* of the transmitting wheel 6. A tooth portion 8*a* of the minute wheel 8 meshes with a small diameter tooth portion 7*b,* coaxial with the large diameter tooth portion 7*a,* of the transmitting wheel 7.

By the foregoing construction, the rotation of the rotor 43 of the first motor M1 is transmitted to the minute wheel 8 via the driving wheel 5, the transmitting wheel 6 and the transmitting wheel 7 disposed at a higher speed side of the first gear train than the minute wheel. As shown in FIGS. 1–2, a tubular portion 8*b* of the minute wheel 8 projects through the lower case 1 to the outside, and a minute hand (not shown) is mounted on the projecting end of the tubular portion 8*b*. In this manner, the first motor M1 drives the minute hand in a timed relation to indicate minute time.

Next, the driving system of the hour wheel 13 will be described. A second motor M2 comprises a stator 51 having an inverted C shape, a driving coil 52 wound around one leg of the stator 51, and a rotor 53 disposed between magnetic poles of the stator 51. The rotation of the motor M2 is transmitted by a second gear train, including a driving wheel 10, a transmitting wheel 11 and a transmitting wheel 12, to the hour wheel 13. The driving wheel 10 has a tooth portion 10*a* meshing with a pinion 53*a* of the rotor 53 and with a large diameter tooth portion 11*a* of the transmitting wheel 11. A large diameter tooth portion 12*a* of the transmitting wheel 12 meshes with a small diameter tooth portion 11*b,* coaxial with the large diameter tooth portion 11*a,* of the transmitting wheel 11. A tooth portion 13*a* of the hour wheel 13 meshes with a small diameter tooth portion 12*b,* coaxial with the large diameter tooth portion 12*a,* of the transmitting wheel 12. A supporting plate 14 is disposed between the minute wheel 8 and the hour wheel 13 to reduce an influence due to friction between the two during rotation thereof.

By the foregoing construction, the rotation of the rotor 53 of the second motor M2 is transmitted to the hour wheel 13 via the driving wheel 10, the transmitting wheel 11 and the transmitting wheel 12 of the second gear train. As shown in FIGS. 1–2, a tubular portion 13*b* of the hour wheel 13 projects through the lower case 1 to the outside and is disposed over the tubular portion 8*b* of the minute wheel 8 and coaxially therewith. An hour hand (not shown) is mounted on the projecting end of the tubular portion 13*b*. In this manner, the second motor M2 drives the hour hand in a timed relation to indicate hour time.

Next, the construction of the detecting means for detecting a respective reference position of the minute wheel 8 and the hour wheel 13 will be described. As shown in FIGS. 1–2, a luminous element comprising a light-emitting device 15, such as, for example, a light-emitting diode, is mounted on the lower case 1 for emitting light. A light-receiving device 16, such as, for example, a photodiode, having a photosensor function is mounted on the upper case 2 opposite to and facing the light-emitting device 15 for receiving light emitted by the light-emitting device. An aperture 7*c* is formed in the transmitting wheel 7, and an aperture 8*c* is formed in a portion of the minute wheel 8 which overlaps with the transmitting wheel 7 and becomes optically aligned with the aperture 7*c* only once per revolution of the minute wheel 8. A plurality of apertures 13*c* are formed in a portion of the hour wheel 13 which overlaps with the minute wheel 8 and each of the apertures is positioned to become aligned with the aperture 7*c* of the transmitting wheel 7 and the aperture 8*c* of the minute wheel 8. The middle plate 3 and the supporting plate 14 are provided with apertures 3*d* and 14*a,* respectively, which are positioned to become optically aligned with the aperture 7*c* of the transmitting wheel 7, the aperture 8*c* of the minute wheel 8, and one of the apertures 13*c* of the hour wheel 13.

By such an arrangement, during operation of the timepiece movement, light emitted from the light-emitting device 15 is received by the light-receiving device 16 only when the aperture 3*d* of the middle plate 3, the aperture 7*c* of the transmitting wheel 7, the aperture 8*c* of the minute wheel, the aperture 14*a* of the supporting plate 14 and one of the apertures 13*c* of the hour wheel become aligned with each other. At the time of alignment, the hour wheel 13 and the minute wheel 8 are in their reference positions (e.g., the 12 o'clock position and the 0 minute position) and light emitted by the light-emitting device 15 passes through the apertures 3*d,* 7*c,* 8*c,* 14*a* and 13*c* and onto the light-receiving device 16, whereby the light-receiving device outputs reference position signals.

As shown in FIG. 2, the printed circuit board 17 is mounted on the upper case 2 by means of engaging pawls 2*c* projecting from an outer surface of the upper case. A control circuit 17*a* for controlling the operation of the first and second drive motors M1, M2 to rotationally drive the minute wheel 8 and the hour wheel 13, respectively, is formed on the circuit board. The light-receiving device 16 is connected to a predetermined position of the control circuit 17*a*. A lead wire 15*a* connected to the light-emitting device 15 extends through the tubular passage defined by the tubular portions 1*b,* 2*b* and 3*c* of the lower case 1, the upper case 2 and the middle plate 3, respectively, and is connected to a predetermined position of the control circuit 17*a*. A program which performs an initiating operation for detecting the respective reference positions of the minute wheel 8 and the hour wheel 13 is installed in the control circuit 17*a*.

Figure 4:
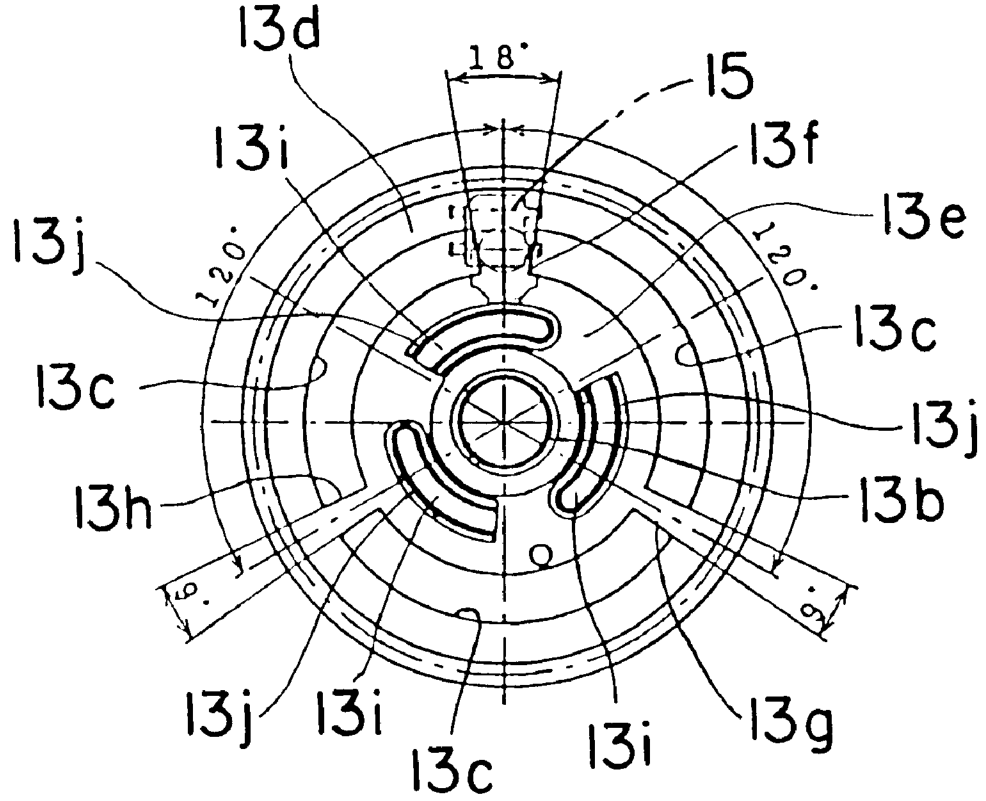
FIG. 4 is a front elevational view of an hour wheel of the timepiece movement according to the preferred embodiment of the present invention.

The structure of the hour wheel 13 according to a preferred embodiment of the present invention is described next with reference to FIG. 4. The apertures 13*c* are formed in the hour wheel 13 to define an outer peripheral portion 13*d* and a central portion 13*e* interconnected by connecting portions 13*f,* 13*g* and 13*h*. In this embodiment, three arc-shaped apertures 13*c* are formed in the hour wheel 13 and are disposed at angularly spaced intervals around the circumference of the hour wheel. However, it is understood by those skilled in the art that other numbers and configurations of the apertures 13*c* are suitable for the hour wheel 13 without departing from the spirit and scope of the invention.

The connecting portions 13*f,* 13*g* and 13*h* define shading portions of the hour wheel 13 and are each positioned to become aligned with the aperture 3*d* of the middle plate 3, the aperture 7*c* of the transmitting wheel 7, the aperture 8*c* of the minute wheel and the aperture 14*a* of the supporting plate 14. At the time of such alignment, the respective shading portion does not permit the light-receiving device to receive light from the light-emitting device. The shading portion 13*f* defines a preselected shading portion having a width greater than the width of each of the shading portions 13*g* and 13*h*. In this embodiment, for example, the shading portion 13*f* has a central angle of 18 degrees, while each of the shading portions 13*g* and 13*h* has a central angle of 9 degrees. Thus, in this embodiment the width of the shading portion 13*f* is twice the width of each of the shading portions 13*g* and 13*h*.

The central portion 13 of the hour wheel 13 is provided with tongue portions 13*i* formed by generally inverted C-shaped slotted grooves 13*j* formed at equal angular intervals. The tongue portions 13*i* are elastically deformable so as to be in flexible contact with the lower case 1.

Figure 5:
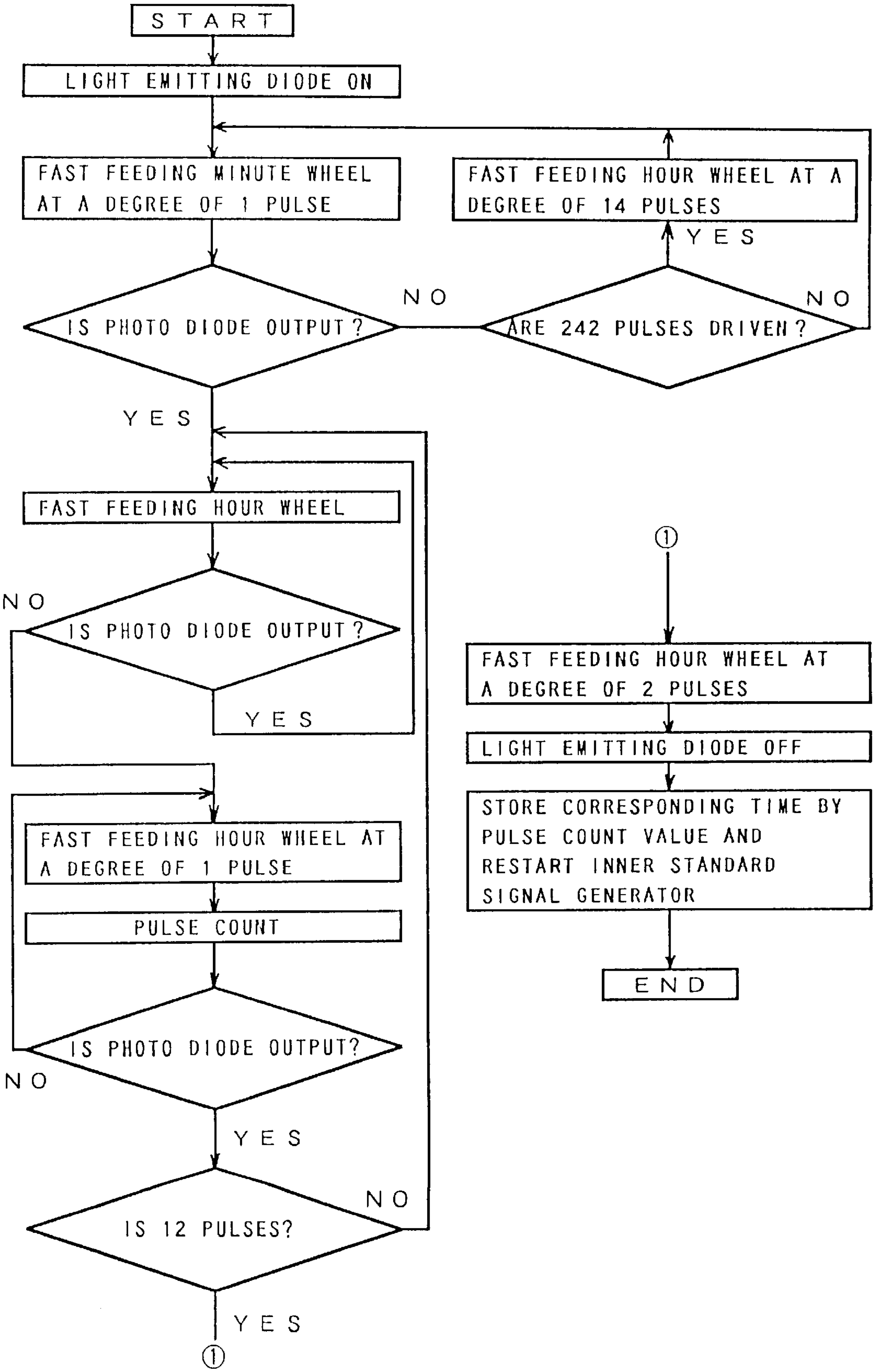
FIG. 5 is a flow chart for explaining an initiating operation for calculating a respective reference position of a minute wheel and an hour wheel of the timepiece movement according to the preferred embodiment of the present invention.

Next, an initiating operation for detecting the respective reference positions of the hour wheel 13 and the minute wheel 8 such as, for example, the 12 o'clock position and the 0 minute position, will be explained below with reference to FIG. 5. At first, according to this embodiment, the minute wheel 8 is set to complete one full rotation by 240 driving pulses of the first driving motor M1. Further, rotation of the shading portions of the hour wheel 13 is set so that 12 driving pulses of the second driving motor M2 are required to rotate the shading portion 13*f* and 6 driving pulses of the second driving motor M2 are required to rotate each of the shading portions 13*g*, 13*h*.

As described above, the light-receiving device 16 outputs reference position signals, corresponding to respective detected reference positions of the minute wheel 8 and the hour wheel 13, when light emitted by the light-emitting device 15 passes through the aligned apertures of the middle plate 3, the transmitting wheel 7, the minute wheel 8, and the hour wheel 13 and is received by the light-receiving device. In this state, the output of the light-emitting device is at a level 1. The output of the light-emitting device is at a level 0 when the apertures of the middle plate 3, the transmitting wheel 7, the minute wheel 8, the hour wheel 13 are not aligned so as to prevent light from passing therethrough.

When the initiating operation is started after stopping an inner standard signal generator, the light-emitting device 15 is turned to an ON state so that driving pulses are supplied to the first driving motor M1 and the minute wheel 8 is driven stepwise. In the case that an output of the light-receiving device 16 is at the level 0, a determination is made whether the number of driving pulses becomes 242. Such determination is continued and the drive of the minute wheel 8 is continued until the number of driving pulses becomes 242. The 242 pulses correspond to the number of pulses obtained by adding 2 pulses for security to the number of the pulses required for one rotation of the minute wheel 8.

When the output of the light-receiving device 16 is at the level 0 even after one rotation of the minute wheel 8, one of the shading portions of the hour wheel 13 is in alignment with the apertures of the transmitting wheel 7 and the minute wheel 8 and light from the light-emitting device 15 is not received by the light-receiving device 16. At this point, the drive of the minute wheel 8 is stopped and driving pulses are supplied to the second driving motor M2 so that the hour wheel 13 is driven stepwise by 14 pulses. Since the number of 14 pulses corresponds to the number pulses obtained by adding 2 pulses for security to the pulse number required for rotating the preselected shading portion 13*f*, the aperture 13*c* of the hour wheel 13 is brought into alignment with the aligned apertures of the transmitting wheel 7 and the minute wheel 8 by slightly rotating the hour wheel 13 so that the light from the light-emitting device 15 can be passed through the apertures and received by the light-receiving device 16. Then, the minute wheel 8 is successively driven. The position in which the output of the light-receiving device 16 is inverted from the level 0 to the level 1 corresponds to the position in which the aperture 8*c* of the minute wheel 8 and the aperture 7*c* of the transmitting wheel 7 are aligned so as to permit light to pass therethrough. This position has a high accuracy due to the provision of the transmitting wheel 7 at the higher speed side of the first gear train. Accordingly, this position is detected and set as the reference position of the minute wheel 8. Then, the drive of the minute wheel 8 is stopped.

Next, in order to detect the reference position of the hour wheel 13, the hour wheel 13 is driven stepwise. Since the aperture 13*b* of the hour wheel 13 passes the light from the light-emitting device 15 when the output of the light-receiving device 16 is at the level 1, the drive of the hour wheel 13 is continued. When the output of the light-receiving device 16 is inverted from the level 1 to the level 0, since one of the shading portions of the hour wheel 13 is aligned with the apertures of the transmitting wheel 7 and the minute wheel 8 and thus crosses the light, a recognition of whether the shading portion is the preselected shading portion 13*f* can be obtained by the time that the output of the light-receiving device remains at the level 0. This time will differ depending on the shading portion of the hour wheel due to the difference in width between the preselected shading portion 13*f* and the shading portions 13*g*, 13*h*. Accordingly, counting of the number of pulses is started at the same time as the drive of the hour wheel 13 is continued. While the output of the light-receiving device 16 is at the level 0, the drive of the hour wheel 13 is continued and the number of pulses is counted.

When the output of the light-receiving device 16 is inverted from the level 0 to the level 1, a determination is made whether the number of pulses counted has reached 12. If the number of pulses counted is less than 12, this means that the shading portion 13*g* or 13*h* has crossed the light, and the hour wheel 13 is again driven. When the output of the light-receiving device 16 is inverted from the level 1 to the level 0, the number of pulses is again counted and the operation is repeated until the number of pulses at a time when the output of the light-receiving device 16 is inverted from the level 0 to the level 1 reaches 12 pulses.

When 12 pulses are counted, this means that the preselected shading portion 13*f* of the hour wheel 13 crosses the light. Then, for security, the hour wheel 13 is further driven for 2 additional pulses, and this position is detected and set as the reference position (e.g., the 12 o'clock position) of the hour wheel 13. The drive of the hour wheel 13 is then stopped and the light-emitting device 15 is turned OFF. The detected position of the hour wheel 13 is then stored and the inner standard signal generator is restarted, thereby terminating the initiating operation.

Although in the above-described embodiment of the present invention 2 drive pulses have been use for security purposes, the number of security pulses is not limited to 2 and may be 1 pulse, or the inverted position may be the reference position. Further, the detected reference position is not limited to the 12 o'clock position, but may be set as the 2 o'clock position, such as in the case of a radio controlled timepiece movement and the like.

By the foregoing construction of the timepiece movement according to the present invention, since the hour wheel and the minute wheel are independently rotated and the respective reference positions of the hour wheel and the minute wheel are detected by detecting means using only one light-emitting device and one light-receiving device, the timepiece movement has a simpler construction, can be manufactured easily at low cost, and is suited to mass-production as compared to conventional timepiece movements of the kind. Furthermore, since detection of the reference positions is performed by the hour wheel, the minute wheel and the transmitting wheel set at a higher speed side of the first gear train than the minute wheel, the reference positions of the minute wheel and the hour wheel can be detected with high accuracy.

Moreover, since the preselected shading portion of the hour wheel has a width greater than the width of each of the other shading portions, detection of the reference position of the hour wheel in the initiating operation can be easily performed.

Moreover, the reference position of the minute wheel can be detected and set by a simple construction of the timepiece according to the present invention. That is, in the case where the output of the light-receiving device is not inverted from the level 0 to the level 1 even after the minute wheel undergoes one rotation while the light-emitting device is turned ON in the initiating operation, the hour wheel is rotated by an amount equal to the width or angular extension of the preselected shading portion, and the minute wheel is driven stepwise again so as to detect the position in which the output of the light-receiving device is inverted from the level 0 to the level 1. The detected position is then set as the reference position of the minute wheel.

By providing the hour wheel with a shading portion having a greater width than the width of the other shading portions, and by disposing the shading portions at equal angular intervals of the hour wheel, the balance and structural strength of the hour wheel can be maintained, even if long apertures are formed, so that a rotating force can be stably transmitted.

From the foregoing description, it can be seen that the present invention comprises an improved timepiece movement. It will be appreciated by those skilled in the art that obvious changes can be made to the embodiment described in the foregoing description without departing from the broad inventive concept thereof. It is understood, therefore, that this invention is not limited to the particular embodiment disclosed, but is intended to cover all obvious modifications thereof which are within the scope and the spirit of the invention as defined by the appended claims.

We claim:

1. A timepiece movement comprising: a minute wheel, a first gear train; first drive means for rotationally driving the first gear train to rotate the minute wheel as a function of minute time; an hour wheel; a second gear train; second drive means operable independently of the first drive means for rotationally driving the second gear train to rotate the hour wheel as a function of hour time; and detecting means for detecting respective reference positions of the minute wheel and the hour wheel and outputting respective reference position signals, the detecting means comprising a light-emitting device for emitting light, a light-receiving device for receiving the light emitted from the light-emitting device, a plurality of apertures disposed in the hour wheel through which light from the light-emitting device passes, and an aperture disposed in the minute wheel through which light from the light-emitting device passes and positioned to become aligned with one of the apertures of the hour wheel.

2. A timepiece movement as claimed in claim 1; wherein the first gear train comprises a transmitting wheel for transmitting the rotational drive of the first drive means to the minute wheel; and wherein the detecting means further comprises an aperture provided in the transmitting wheel through which light from the light-emitting device passes and positioned to become aligned with the aperture of the minute wheel and one of the apertures of the hour wheel.

3. A timepiece movement as claimed in claim 2; wherein the apertures of the hour wheel are separated by a plurality of shading portions of the hour wheel for preventing light from the light-emitting device to pass therethrough to the light-receiving device, a preselected one of the shading portions having a width different than a width of each of the other shading portions.

4. A timepiece movement as claimed in claim 3; wherein the plurality of shading portions of the hour wheel comprise three shading portions disposed at equal angular intervals.

5. A timepiece movement as claimed in claim 3; further comprising control means for controlling operation of the first drive means and the second drive means to rotationally drive the minute wheel, the transmitting wheel and the hour wheel to invert an output of the light-receiving device between a level 0, corresponding to a condition where the aperture of each of the minute wheel and the transmitting wheel and one of the apertures of the hour wheel are not in alignment and prevent light emitted from the light-emitting device to be passed therethrough to the light-receiving device, and a level 1, corresponding to a condition where the aperture of each of the minute wheel and the transmitting wheel and one of the apertures of the hour wheel are in alignment to thereby permit light emitted from the light-emitting device to be passed therethrough to the light-receiving device.

6. A timepiece movement as claimed in claim 5; wherein the control means includes means for determining the reference position of the minute wheel by driving the minute wheel and the hour wheel in a stepwise manner while the light-emitting device emits light, detecting a position of the minute wheel when the output of the light-receiving device is inverted from the level 0 to the level 1, and setting the detected position of the minute wheel as the reference position of the minute wheel.

7. A timepiece movement as claimed in claim 6; wherein the control means includes means for determining the reference position of the hour wheel by driving the hour wheel in a stepwise manner while the minute wheel is not driven to selectively bring one of the shading portions of the hour wheel into alignment with the aperture of the minute wheel and the aperture of the transmitting wheel to thereby invert the output of the light-receiving device between the level 1 and the level 0, detecting a position of the hour wheel when the output of the light-receiving device is inverted to the level 1 after the hour wheel is rotated following the preselected shading portion coming into alignment with the aperture of the minute wheel and the aperture of the transmitting wheel, and setting the detected position of the hour wheel as the reference position of the hour wheel.

8. A timepiece movement as claimed in claim 7; wherein the control means includes means for recognizing when the preselected shading portion of the hour wheel has been aligned with the aperture of the minute wheel and the aperture of the transmitting wheel on the basis of the difference in width between the preselected shading portion and the other shading portions of the hour wheel.

9. A timepiece movement as claimed in claim 8; wherein the preselected shading portion of the hour wheel has a greater width than the width of each of the other shading portions.

10. A timepiece movement as claimed in claim 9; wherein the plurality of shading portions of the hour wheel comprise three shading portions disposed at equal angular intervals.

11. A timepiece movement as claimed in claim 10; wherein the transmitting wheel is disposed at a higher speed side of the first gear train than the minute wheel.

12. A timepiece movement as claimed in claim 2; wherein the transmitting wheel is disposed at a higher speed side of the first gear train than the minute wheel.

13. A timepiece movement comprising: a light-emitting device for emitting light; a light-receiving device for receiving the light emitted from the light-emitting device; an hour wheel having a plurality of apertures through which light from the light-emitting device may pass; an hour wheel gear train for rotationally driving the hour wheel as a function of hour time; a minute wheel having an aperture through which light from the light-emitting device may pass, the aperture being positioned to become aligned with respective ones of the apertures of the hour wheel during rotation of the minute and hour wheels; and a minute wheel gear train for rotationally driving the minute wheel as a function of minute time.

14. A timepiece movement as claimed in claim 13; wherein the minute wheel gear train comprises a transmitting wheel for transmitting the rotational drive of the minute wheel train to the minute wheel, the transmitting wheel having an aperture through which light from the light-emitting device passes, the aperture of the transmitting wheel being positioned to become aligned with the aperture of the minute wheel and one of the apertures of the hour wheel.

15. A timepiece movement as claimed in claim 14; wherein the apertures of the hour wheel are separated by a plurality of shading portions of the hour wheel for preventing light from the light-emitting device to pass therethrough to the light-receiving device, a preselected one of the shading portions having a width different than a width of each of the other shading portions.

16. A timepiece movement as claimed in claim 15; wherein the plurality of shading portions of the hour wheel comprise three shading portions disposed at equal angular intervals.

17. A timepiece movement as claimed in claim 15; further comprising control means for controlling operation of the hour wheel train and the minute wheel train to rotationally drive the minute wheel, the transmitting wheel and the hour wheel to invert an output of the light-receiving device between a level 0, corresponding to a condition where the aperture of each of the minute wheel and the transmitting wheel and one of the apertures of the hour wheel are not in alignment and prevent light emitted from the light-emitting device to be passed therethrough to the light-receiving device, and a level 1, corresponding to a condition where the aperture of each of the minute wheel and the transmitting wheel and one of the apertures of the hour wheel are in alignment to thereby permit light emitted from the light-emitting device to be passed therethrough to the light-receiving device.

18. A timepiece movement as claimed in claim 17; wherein the control means includes means for determining the reference position of the minute wheel by driving the minute wheel and the hour wheel in a stepwise manner while the light-emitting device emits light, detecting a position of the minute wheel when the output of the light-receiving device is inverted from the level 0 to the level 1, and setting the detected position of the minute wheel as the reference position of the minute wheel.

19. A timepiece movement as claimed in claim 18; wherein the control means includes means for determining the reference position of the hour wheel by driving the hour wheel in a stepwise manner while the minute wheel is not driven to selectively bring one of the shading portions of the hour wheel into alignment with the aperture of the minute wheel and the aperture of the transmitting wheel to thereby invert the output of the light-receiving device between the level 1 and the level 0, detecting a position of the hour wheel when the output of the light-receiving device is inverted to the level 1 after the hour wheel is rotated following the preselected shading portion coming into alignment with the aperture of the minute wheel and the aperture of the transmitting wheel, and setting the detected position of the hour wheel as the reference position of the hour wheel.

20. A timepiece movement as claimed in claim 19; wherein the control means includes means for recognizing when the preselected shading portion of the hour wheel has been aligned with the aperture of the minute wheel and the aperture of the transmitting wheel on the basis of the difference in width between the preselected shading portion and the other shading portions of the hour wheel.

21. A timepiece movement as claimed in claim 20; wherein the preselected shading portion of the hour wheel has a greater width than the width of each of the other shading portions.

22. A timepiece movement as claimed in claim 21; wherein the plurality of shading portions of the hour wheel comprise three shading portions disposed at equal angular intervals.

23. A timepiece movement as claimed in claim 22; wherein the transmitting wheel is disposed at a higher speed side of the minute wheel gear train than the minute wheel.

24. A timepiece movement as claimed in claim 14; wherein the transmitting wheel is disposed at a higher speed side of the minute wheel gear train than the minute wheel.

25. A timepiece movement as claimed in claim 13; wherein the apertures of the hour wheel are separated by a plurality of shading portions of the hour wheel for preventing light from the light-emitting device to pass therethrough to the light-receiving device, a preselected one of the shading portions having a width different than a width of each of the other shading portions.

26. A timepiece movement as claimed in claim 25; wherein the plurality of shading portions of the hour wheel comprise three shading portions disposed at equal angular intervals.

* * * * *